United States Patent [19]
Moll et al.

[11] Patent Number: 5,884,295
[45] Date of Patent: Mar. 16, 1999

[54] SYSTEM FOR NEURAL NETWORK INTERPRETATION OF AEROMAGNETIC DATA

[75] Inventors: Robert Frederick Moll, Englewood; William Chelsie Pearson, Lakewood; John Robert Rogers, Castle Rock; Jacky Muri Wiener, Englewood, all of Colo.

[73] Assignee: Texaco Inc., White Plains, N.Y.

[21] Appl. No.: 202,609

[22] Filed: Feb. 28, 1994

Related U.S. Application Data

[62] Division of Ser. No. 783,016, Oct. 25, 1991, Pat. No. 5,355,313.

[51] Int. Cl.[6] .................................................. G06F 15/18
[52] U.S. Cl. ................................. 706/16; 702/14
[58] Field of Search ........................... 395/21; 364/42 D, 364/422, 421

[56] References Cited

U.S. PATENT DOCUMENTS 5,181,256  1/1993  Kamiya ................................. 382/156
5,214,744  5/1993  Schweizer ............................. 382/103
5,265,192  11/1993  McCormack ........................... 706/230

OTHER PUBLICATIONS

Reilly, D.L., and Cooper, L.N., "An Overview of Neural Networks..." An Intro. to Neural and Electronic Networks, Aademic Press, 1990, pp. 227–248.

Specht, D. F., "Probabilistic Neural Networks...", IEEE Trans. on NN, v.1, n.1, 1990, PP. 111–221.

*Primary Examiner*—Robert W. Downs
*Assistant Examiner*—A. Katbab
*Attorney, Agent, or Firm*—Henry H. Gibson; William J. Beard

[57] ABSTRACT

A system for processing Aeromagnetic survey data to determine depth to basement rock is disclosed. The system uses Neural Networks having an input layer of elements, a hidden layer of elements and an output layer of elements which are interconnected by a weighted system of interconnections. A training session using known input and output data is used to train the Neural Network by adjusting the weighting functions repetitively to minimize any error in the output of the Neural Network.

5 Claims, 3 Drawing Sheets

SYSTEM FOR NEURAL NETWORK INTERPRETATION OF AEROMAGNETIC DATA

This is a division of patent application Ser. No. 07/783,016, filed Oct. 25, 1991 now U.S. Pat. No. 5,355,313, issued Oct. 11, 1994.

BACKGROUND OF THE INVENTION

1. The Field of the Invention

The present invention relates to a method for locating magnetic structural bodies within the earth and in particular to a method using neural networks for determining the subsurface location, geometry and depth to basement of these bodies from aeromagnetic data.

2. The Prior Art

Determination of the location and the depth to basement faults and structures in the earth is one of the most important reconnaissance exploration tools in the petroleum exploration industry. This is because many hydrocarbon reservoirs are associated with uplifted basement fault blocks and accurate mapping of subsurface structures greatly improves exploration well success rates and lowers the cost of finding hydrocarbons in sedimentary basins.

Subsurface geologic structure is commonly deduced from the mapping of surface structures and features, well log correlations, and by seismic reflection and refraction profiling. However, surface features do not always reflect deep structure when masked by surficial alluvium and moderately lithified shallow sediments. Also, the high cost of drilling deep exploratory well holes and collecting reflection seismic data often preclude their economic usefulness in delineating deep structures. Thus surveys which measure the magnetic field at or above the earth's surface, particularly from an airplane (aeromagnetics), can be an economic, environmentally attractive alternative to these other methods in unexplored or underexplored sedimentary basins.

Currently, aeromagnetic data are interpreted using combinations of simple computational and empirical techniques. The following Table I lists several of the manual and computer techniques currently used to predict location and depth of magnetic basement structural features.

TABLE I

LIST OF TECHNIQUES

1. Qualitative correlation of observed magnetic data over known oil fields to aeromagnetic survey lines.
2. Qualitative correlation of modeled magnetic anomalies over target structures with aeromagnetic survey lines.
3. Empirical depth determination using graphical techniques, such as the Peter's half slope method.
4. Computer depth and location solutions for corners of magnetic bodies (Werner Deconvolution).
5. Computer direct modeling and fitting using interactive graphics workstations.
6. Computer inverse modeling (both 2D and 3D modeling).
7. Qualitative correlation of filtered aeromagnetic maps (second vertical derivative) to known oil fields.

However, these techniques are limited in their usefulness and accuracy largely due to the difficulty in differentiating between magnetic anomalies related to compositional contrasts and anomalies related to structural relief. Furthermore, the manual techniques are largely qualitative and yield approximate lateral locations and can not accurately determine depth or vertical relief of the deep structures. Because of these problems in magnetic interpretation and analysis, aeromagnetic data has been of limited use in the petroleum exploration industry today.

SUMMARY OF THE INVENTION

Deep basement structures can be accurately located and their shapes mapped from aeromagnetic data using neural network technology. Neural networks are pattern recognition tools that make use of parallel connections of simple non-linear functions. The simplifying assumptions and limitations required by current interpretational art is no longer necessary because the neural network learns the relationship between observed magnetic fields and deep basement structures. Additionally, once the network learns this relationship, it can accurately determine structure throughout the geologic province.

The invention concerns a method of accurately determining the depth, geometry, and location of basement structures from aeromagnetic data using neural networks. It comprises forward modeling of a given basement response on a computer and inputting this computed response into a specially designed backpropagation neural network for the training phase of the invention. What this means is that the neural network "learns" the appropriate magnetic response to a given basement configuration. Once trained, the neural network is then applied to the remaining aeromagnetic data in the area to produce the basement structure for interpretation.

BRIEF DESCRIPTION OF THE DRAWINGS

The present invention will now be described, by way of example, with reference to the accompanying drawings, in which.

DETAILED DESCRIPTION OF THE PRESENT INVENTION

Heretofore the known method for aeromagnetic processing and interpretation for basement structures has involved a number of qualitative and quantitative procedures which are highly correlated and not particularly accurate. These procedures would typically involve some forward modeling on a computer to calculate the magnetic response of a desired basement structure. This response would then be qualitatively correlated to the aeromagnetic data to see if a similar response exists on the observed data. This procedure would be accompanied by some inverse modeling to determine if an interpreted magnetic anomaly could be caused by a basement structure. These procedures would be iterated until a decision is reached, in concert with the above, and the mapped aeromagnetic data would be run through a series of mathematical filters (i. e. 2nd vertical derivative, horizontal derivative, high pass, structural inversion, etc.). Also, to accentuate structural relief, the map procedures would then be correlated to the profile procedures and the best guess would be made as to the basement configuration. Clearly, this is a time-consuming, laborious process and only yields a qualitative approximation, at best. As a result, aeromagnetic data has been considered to be of limited value to the petroleum exploration industry.

Figure 1:
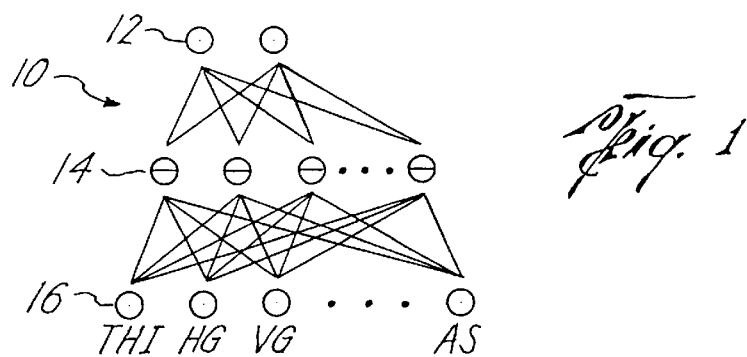
FIG. 1 is a schematic of the general architecture of a neural network.
Figure 2:
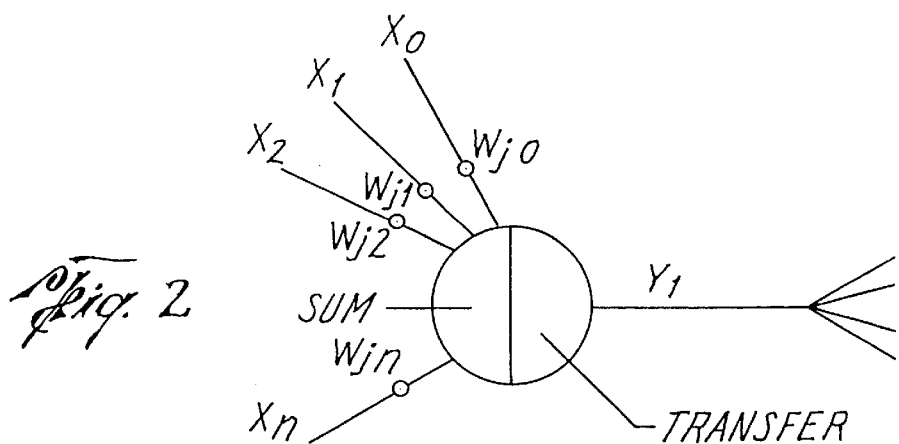
FIG. 2 is a schematic of a neural processing element.

A different approach is employed in accordance with the present invention. For the present invention, highly accurate and more rapid reduction of aeromagnetic data for delineating basement structure is achieved through the use of neural networks. The neural network 10 (FIG. 1) is designed with three layers, an input layer 12 which contains the aeromagnetic data, an intermediate or hidden layer 14, and an output layer 16 which contains the information to be learned. All of the layers are fully connected to one another. The network preferably contains nine input elements, five hidden elements, and nine output elements to distinguish between compositional bodies and structural bodies on the aeromagnetic data. It should be here noted that one skilled in the art may come up with many variations on the network design in order to achieve comparable results without departing from the spirit or essential characteristics of the present invention. For this example of the invention, the input variables included total field intensity, lagged total field intensity and various transforms from both real and synthetically generated data. What this means is that the total magnetic intensity samples were shifted up and down around a magnetic sample creating a window of data around a central point so that the neural network could "sense" both the amplitude of the anomaly as well as the frequency.

The computer generated or synthetic magnetic profile responses were used to "train" the neural network to recognize a variety of possible structural features anticipated to be found in the real data. During training, the neural network was given the synthetic data, asked to analyze it and predict the structure. This predicted structure was then compared with the structure used to generate the synthetic data, also lagged in the same manner as the total magnetic intensities, and the connection weights were adjusted to minimize the difference between the predicted and actual model.

In backpropogation, the responsibility for reducing output error is shared among all of the connection weights. In this invention, the well known Delta Rule is used for weight adjustment during learning. The global error function to be minimized is defined as $$E = 0.5 * \Sigma_k (D_k - O_k)^2$$

where the subscript k refers to the kth output node $D_k$ is the desired output, and $O_k$ the actual output from the kth output node.

The global error is then redistributed throughout the network according to $$E_j^{(s)} = F'(I_j^{(s)}) * \Sigma_k (E_k^{(s+1)} * W_{kj}^{(s+1)})$$

where $E_j^{(s)}$ is the error assigned to the jth node in the sth layer. The connection weights are then adjusted according to $$\Delta W_{ji} = lcoef * E_j^{(s)} * X_i^{(s-1)}$$

where 0<lcoef<1 is the learning coefficient.

It is the connection weight values at the end of training that determine the quality of the network for basement relief mapping.

This was done until the difference between the predicted and actual structure reached an acceptable tolerance, usually around 8,000 passes of the data. Once training of the neural network was completed, the network was then rigorously tested against known structural anomalies on aeromagnetic data, as well as other training data, to insure the accuracy of the results.

The procedure for deriving subsurface structure of the magnetic basement from recorded aeromagnetic profile data requires six steps.

1. The 2-dimensional magnetic profile response is calculated for one or more basement structural features constructed with geometrical dimensions characteristic of the basin under study. These computer generated, synthetic responses or profiles are then saved and used to train the neural network preparatory to analysis of the real aeromagnetic data. The synthetic data is generated at the same spacing as will be used in the recording of the aeromagnetic data over the area of interest.

2. The aeromagnetic profile response is recorded over the study area of interest and processed according to standard art to remove erroneous readings and the International Geomagnetic Reference Field.

3. A window of data including the samples on either side of a central data point is used for input into the neural network. The number of data samples in the window equals the number of input nodes in the neural network. This window is shifted along the profile by one sample point and the analysis is repeated and this procedure is followed from one end of the profile to the other. This procedure is followed for both the synthetic profiles and the field recorded profiles.

4. The synthetic profiles are used to "train" the neural network to recognize magnetic anomalies caused by various subsurface structural types likely to be encountered in the study area. During the training process, the neural network is repeatedly given the synthetic data from Step 1 and asked to predict the structure. Node weights are adjusted as described above and learning takes place. The training may be repeated up to 8,000 iterations before acceptable levels of performance are achieved.

5. The trained network is then tested on aeromagnetic data somewhere in the basin where structure is already accurately known from drilling and/or seismic profiling. If performance is acceptable, the network can be applied to aeromagnetic data from the study area in the same basin, Step 6. If performance is unacceptable, Steps 1, 3, and 4 must be repeated until acceptable performance is achieved.

6. Finally, the network is applied to the processed aeromagnetic data from Step 2 and a map or subsurface structure is made from the results.

This six step procedure of network training using computer generated synthetic data from models characterizing the basin and network application to the analysis of field recorded aeromagnetic data from the same basin is demonstrably quicker and more accurate than is possible with the heretofore known practices.

Figure 3:
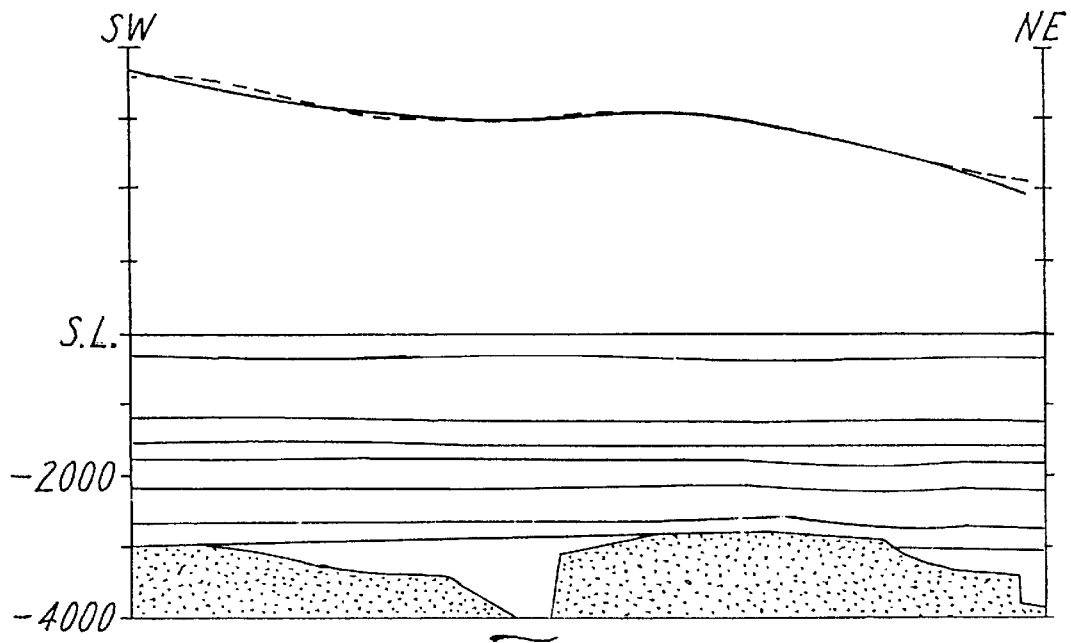
FIG. 3 is a typical magnetic inverse model over a known oilfield.
Figure 4:
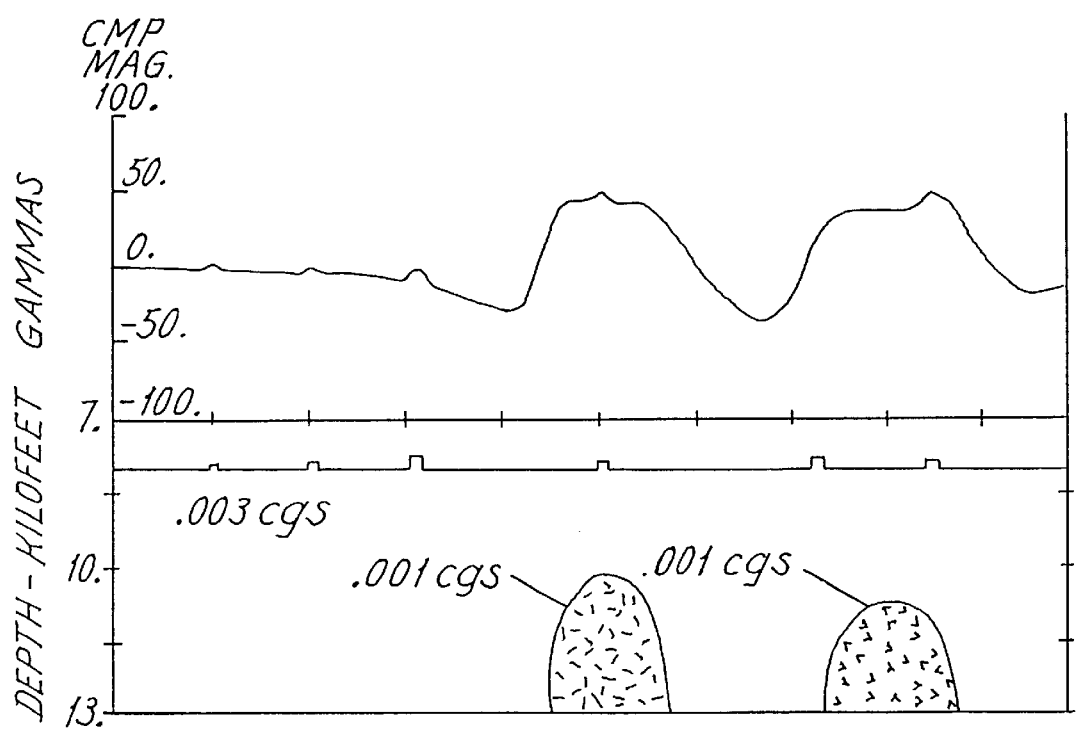
FIG. 4 is a theoretical structural model used to train the neural network.
Figure 5:
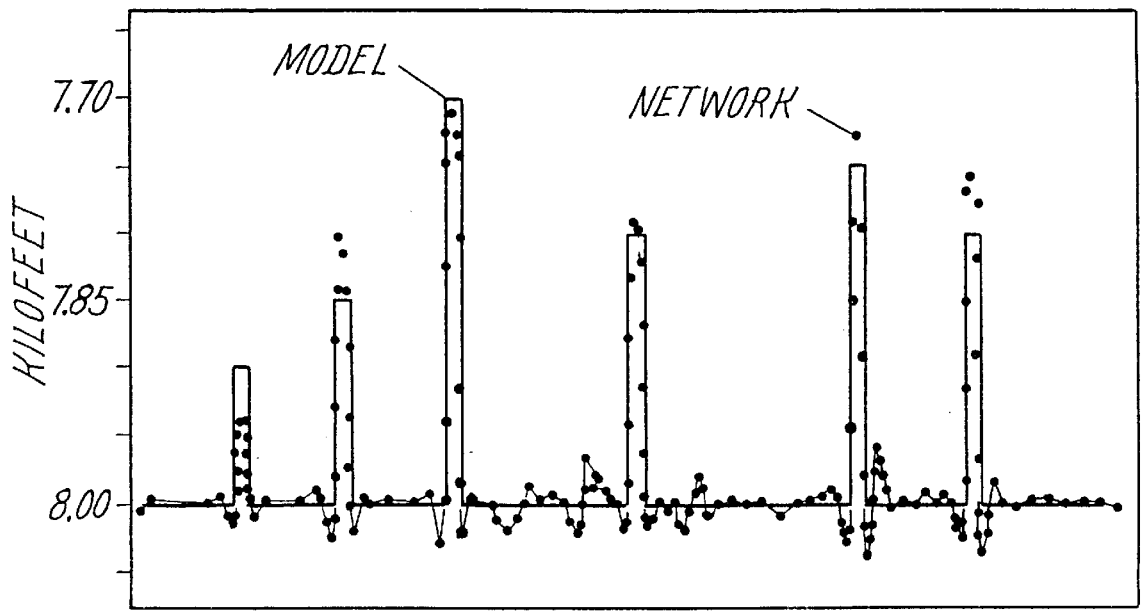
FIG. 5 is the result of applying the neural network to the training model.
Figure 6:
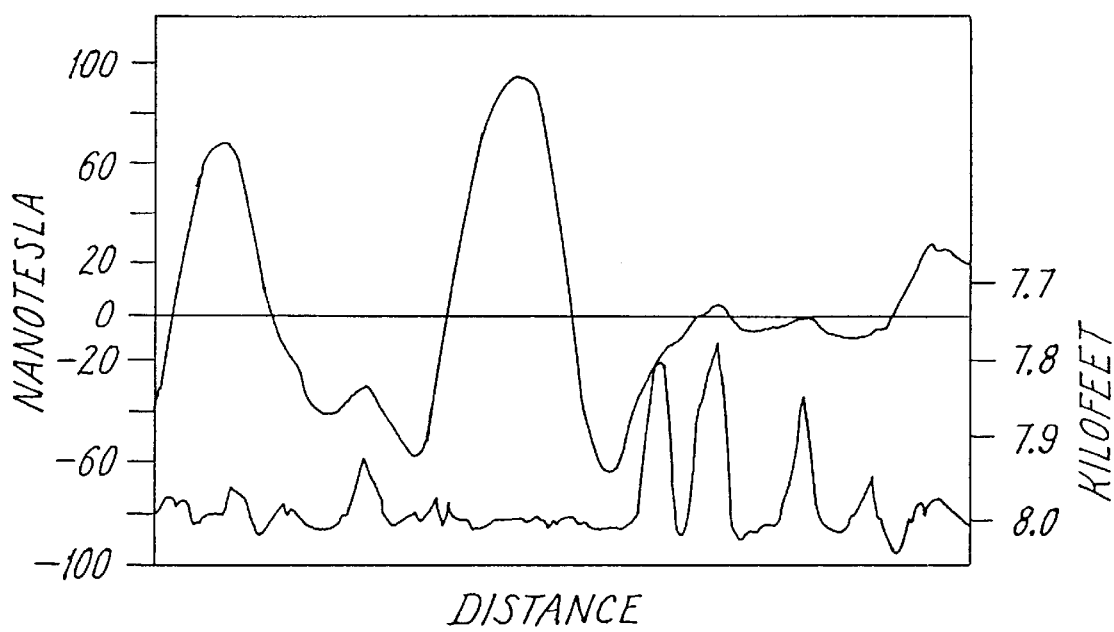
FIG. 6 shows the results of applying to the network to a given magnetic profile producing the basement relief.

FIG. 3 is a typical magnetic profile model across a known oil field. FIG. 4 is a theoretical structure model including six small basement structures and two intrabasement compositional bodies and used to train the subject neural network. FIG. 5 is the result of applying the network to the training model. FIG. 6 is the result of applying the network to an actual aeromagnetic profile across the test field producing basement relief.

The neural network system has proven to be a fast, accurate, and objective method for recognition of magnetic structural anomalies even in the presence of noise and intrabasement signal.

The present embodiment is intended in all respects to be illustrative and not restrictive as to the scope of the present invention as defined by the appended claims.

We claim:

1. A system for determining the existence of subsurface earth structural anomalies using aeromagnetically measured data representative of magnetic field strength at known positions above the surface of the earth as input data, and for producing processed output data comprising plots of depth to basement rock at corresponding known positions above the surface for the earth, said system comprising:

a programmed digital computer having a memory and forming a neural network having a multiple element input layer each element of which is capable of receiving input digital data comprising representations of magnetic field strengths at known positions above the surface of the earth and for producing output signals, each element of which is connected to plural element of a hidden layer of elements via a first weighted system of interconnections, the weights of which are in said memory and which memory content is program control, and said hidden layer elements each having a sum function and a transfer function associated therewith for summing all input signals to each element and for applying said transfer function to such sum to produce an output signal from each element, and an output layer of elements each of which has an input connected to plural hidden layer elements via a second weighted system of interconnections, the weights of which are adjustable under program control, said output layer elements each having a sum function and a transfer function associated therewith for summing all input signals to each element and for applying said transfer function to such sum to produce an output signal representative of depth to basement rock at known positions above the surface of the earth;

program means stored in said computer memory and being executable by said computer for training said programmed digital computer forming a neural network by repetitively inputting representative aeromagnetically measured data above the surface of the earth over known depth to said output layer element with said known depth to basement rock to form error signals, and for changing as a function of said error signals the content of memory locations of said first and second systems of interconnections between said input layer and said hidden layer and said output layer of elements so as to minimize the magnitude of said output layer of elements so as to minimize the magnitude of said error signals, until such magnitude is smaller than a predetermined accuracy value; and means for plotting said depth to basement rock at corresponding known positions above the surface of the earth.

2. The apparatus of claim 1 wherein said input layer of elements, said hidden layer of elements and said output layer of elements are each fully interconnected by interconnections of said first and second weighted interconnection systems.

3. The system of claim 2 wherein said hidden layer of elements comprises fewer elements than said input layer of elements.

4. The system of claim 2 wherein said hidden layer of elements comprises more elements than said output layer of elements.

5. The system 1 wherein said program means further comprises means for correcting aeromagnetic representative survey data to remove therefrom erroneous readings and the International Geomagnetic Reference Field prior to supplying said data to said hidden layer of elements.

* * * * *